Oct. 27, 1953 F. GRAY 2,657,309

STORAGE DEVICE UTILIZING SEMICONDUCTOR

Filed Jan. 11, 1951 3 Sheets-Sheet 1

INVENTOR
F. GRAY
BY Harry C. Hart
ATTORNEY

STORAGE DEVICE UTILIZING SEMICONDUCTOR

Filed Jan. 11, 1951 3 Sheets-Sheet 2

INVENTOR
F. GRAY
BY Harry C. Hart
ATTORNEY

Oct. 27, 1953 F. GRAY 2,657,309

STORAGE DEVICE UTILIZING SEMICONDUCTOR

Filed Jan. 11, 1951 3 Sheets-Sheet 3

INVENTOR
F. GRAY
BY Harry C. Hart
ATTORNEY

Patented Oct. 27, 1953 2,657,309

UNITED STATES PATENT OFFICE 2,657,309

STORAGE DEVICE UTILIZING SEMICONDUCTOR

Frank Gray, East Orange, N. J., assignor to Bell Telephone Laboratories, Incorporated, New York, N. Y., a corporation of New York Application January 11, 1951, Serial No. 205,548

9 Claims. (Cl. 250—27)

This invention relates to the translation of electric currents and particularly to the utilization of semiconductor materials in a novel manner to translate the current of an electron beam.

A principal object of the invention is to initiate the flow of a persistent current by the application of a momentary electric impulse. A related object is to combine in a single structure the characteristics of amplification and memory.

Another object is to convert information in the form of a sequence of short electric impulses which appear on a single conductor and follow one another in time into a space pattern of electric conditions among a multiplicity of different conductors, which conditions can endure in substantial independence of the passage of time until they are deliberately altered by erasure.

In Bardeen Patent 2,524,033, there is described a translating device for electric currents which comprises a block of semiconductor material such as P-type silicon or N-type germanium having a first electrode plated over a substantial area of one face thereof and making low resistance contact with the body of the block, a point electrode engaging the opposite face, biased in the reverse direction, and a control electrode close to the semiconductor block and to the point electrode but insulated from each of them by a thin film of insulating material. It is found that application of a signal to the control electrode modifies the current flowing in an external work circuit through the block from the base to the point contact electrode and across a high resistance barrier which is believed to exist in the interior of the block. Best results are obtained when the control electrode actually surrounds the point contact electrode.

The action of that device is apparently due to the setting up of an electric field across the film of insulation, which field extends into the body of the semiconductor material and modifies the number of mobile charges in at least a thin layer of the semiconductor material immediately under the insulating film and so the conductivity and resistance of this layer. Especially is this alteration significant in the immediate vicinity of the point contact electrode. Here, because the point contact electrode is worked in its reverse or high resistance direction, its contact resistance constitutes the major part of the resistance of a work circuit which interconnects the point contact electrode with the base and, therefore, the controlling part.

An application of Frank Gray, Serial No. 84,644, filed March 31, 1949, now Patent No. 2,547,386, issued April 3, 1951, is based on the discovery that the control electrode of the aforementioned Bardeen patent may be replaced by an electron beam which, bombarding the insulating film in the vicinity of the collector contact, produces an equal or superior surface charge and so an equal or superior collector current change. In other words, the semiconductor triode of the Bardeen patent is replaced by a semiconductor diode to whose insulated surface a charge is applied by a cathode beam. When the beam is turned off or deflected, the surface charge proceeds to leak off, and the collector current increase to decay with it. Because of the highly insulating quality of the film, this leakage and decay take place very slowly, requiring an hour or so to return to their original values. Opening the collector circuit does not restore the original conditions. It merely interrupts the decaying collector current, which returns to its slowly decaying value as soon as the collector circuit is reestablished. If it is desired to restore the original conditions more rapidly, the surface charge must be artificially removed as by again bombarding the film, but this time with a secondary electron collector anode biased positively to withdraw secondary electrons from the film in a ratio greater than unity.

In general, the current-voltage characteristic of a semiconductor diode such as a germanium point contact rectifier has a "forward" part in which the resistance is comparatively small and positive and a "reverse" part in which, for small values of current the resistance is large and positive, for larger values the variational resistance is negative, and for some intermediate value there is a voltage peak. When the instrumentality which manifests such a characteristic is connected to a resistor and a current source whose straight-line characteristic intersects it in three points, the two end points represent stable operating conditions while the intermediate point represents an unstable condition. This phenomenon is well known to lay the basis for trigger action.

In the aforementioned application of Frank Gray, operation was restricted to the high positive reverse resistance part of the diode characteristic. The peak-voltage current was never exceeded, possibly for the reason that with the highly insulating film employed, it was not possible to produce at the surface of the semiconductor block an electrostatic field of sufficient intensity to drive the diode "over the hump," i. e., past the reverse voltage peak, and possibly for the reason that the collector load and source were not suitable. The present invention is based on the discovery that when the thickness of the charge-sensitizing surface film and the characteristics of the semiconductor material are suitably controlled and when the collector load circuit is suitably proportioned, it is possible so to charge the surface film by the beam electrons as to force the operating condition of the diode beyond the voltage peak of its characteristic. Trigger action immediately takes place, and a collector current flows which is ten or more times as great as the original high resistance collector current. This current is indeed so large that precautions must be taken, as by careful choice of the magnitude of the resistance into which the device works, lest the diode be burned out. The conditions of operation, though differing widely from the original conditions, are equally stable. Therefore, short of burn-out of the diode, the increased collector current persists indefinitely as long as the collector circuit is established, and this despite the fact that the surface charge which initiates the trigger action leaks off rapidly. Because of the high ratio of this increased current to the original collector current, it may conveniently be employed to operate a marginal load such as a relay whose spring tension leaves it unoperated by the original current. When the actuation of the relay has served its purpose, it may be restored to its unoperated condition simply by a momentary opening of the collector circuit. This reduces the collector current to zero. When the collector circuit is again closed, the diode finds itself in its high resistance condition, i. e., on the low current or high positive resistance side of the voltage peak.

The invention lends itself readily to the construction of a beam tube distributor wherein the target comprises a multiplicity of such individual insulated semiconductor blocks, each with its properly biased point contact electrode, each constituting a diode. These diodes may be arranged in any desired array, such as a linear one or a circular, a spiral or a rectangular one, as desired. The electron beam may be directed onto one or other of these diodes by application of suitable signals to conventional beam-deflecting elements, and the beam itself may be turned on and off by application of a signal to a beam-modulating electrode. Individual loads such as relays may be included in the circuit of the several collector electrodes. Impact of the beam, when turned on, on any particular diode trips it to its high conduction condition and so initiates the flow of current in the relay connected with its collector electrode. The surface charge leaks off rapidly, but the collector current persists indefinitely after the beam has moved on to cause similar initiation of currents in others of the relays. When the actuation of the relay has served its purpose, the relay may be restored to its original condition simply by momentarily opening the collector circuit.

Because of the fact that the area on the block surface of mutual influence between the beam-produced surface charge and the charge-sensitive collector is very small, the target may conveniently comprise a single large block or strip of semiconductor material having a number of individual collector electrodes making point contact with its surface at spaced points. Each such contact point may then operate as a diode independently of the others.

The invention will be fully apprehended from the following detailed description of preferred illustrative embodiments thereof, taken in connection with the appended drawings, in which.

Figure 1:
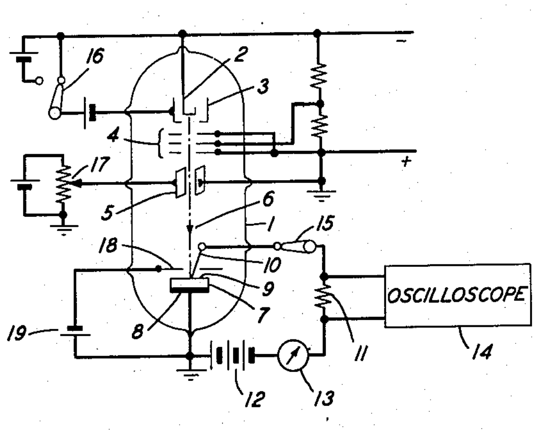
Fig. 1 is a schematic diagram showing simplified apparatus embodying the invention.

Referring now to the drawings, Fig. 1 is a schematic diagram of simplified apparatus embodying the invention. This figure shows a tube comprising an evacuated envelope 1 containing the normal electrodes of an electron gun, namely, a cathode 2, a control grid 3, electron-optical beam-focusing electrodes 4, and beam-deflecting elements 5. All of these elements may be conventional. The target on which the electron beam 6 impinges, when suitably directed, comprises a block 7 of semiconductor material such as N-type germanium mounted on a metallic base 8, which serves as an electrical connection. The surface 9 of the block 7 which faces the electron gun is provided with a charge-sensitizing film. With germanium or silicon as the material of the semiconductor block 7, a convenient way of obtaining the necessary insulating film is to oxidize the surface of the block to form a thin layer of germanium oxide or silicon oxide on its surface. Each of these compounds is a good insulator with a sufficiently high dielectric constant.

It has been found that heating a germanium block to about 490° C. for two hours or so in a moist atmosphere in the presence of minute quantities of carbon results in the formation on the block surface of an exceedingly thin insulating film of germanium oxide which has all of the requisite properties. To this end, a small quantity, for example, 10 grams of a pure non-volatile hydrocarbon or carbohydrate such as cane sugar, may be dissolved in a liter of distilled water and thoroughly mixed. The surface of the block is then painted with a layer of this exceedingly dilute solution and subjected to the heat treatment. The presence of this dilute solution appears to act as an oxidizing agent or catalyst and provides a thicker and more uniform oxidized film than has been possible heretofore. However, any insulator and any method of applying the film is suitable, those having high resistance and a high dielectric constant being preferred.

The conductivity of the semiconductor material and especially of its surface layer immediately beneath the insulating film should preferably be temperature-sensitive, increasing as its temperature is raised. It is known that a so-called "depletion layer," i. e., one in which the significant impurities have been reduced in number as compared with their numbers in the body of the material, has this property; and it may be that the presence of carbon atoms in the solution with which the block surface is coated acts in the course of the heat treatment to deplete the surface layer of the semiconductor material and so to increase its temperature sensitivity.

A wire 10 with a sharpened end makes point contact with the surface 9 of the germanium block which faces the electron gun. This electrode, which is termed the collector, pierces the film of insulation to make contact directly with the semiconductor material. This collector electrode 10 may be of tungsten or other suitable metal. It is connected through an output resistor 11, a battery 12, and a switch 15 to the base 8. The current in the output circuit may be observed on a meter 13 or on an oscilloscope 14 connected across the output resistor 11. The contact which this collector electrode 10 makes with the germanium block 7 should be an electrical rectifier contact and should be biased as by the battery 12 to operate in its reverse or high resistance direction. This gives the contact the characteristics of peak reverse voltage and negative resistance with which the invention deals. The electron focusing system focuses a beam 6 of electrons on the block 7 at the point of contact of the collector 10 or very close to it. This beam can be turned on and off by application of a suitable negative voltage to the control electrode 3, as by operating a switch 16. A voltage is applied to sweep plates 5 and can be varied, as by adjustment of a movable tap 17 of a voltage divider to control the location of the beam 6 with respect to the point contact of the collector electrode 10. An auxiliary anode 18 is located in front of the germanium block 7 and is biased negatively as by a battery 19 to prevent the flow of secondary electrons away from its surface 9.

Figure 2:
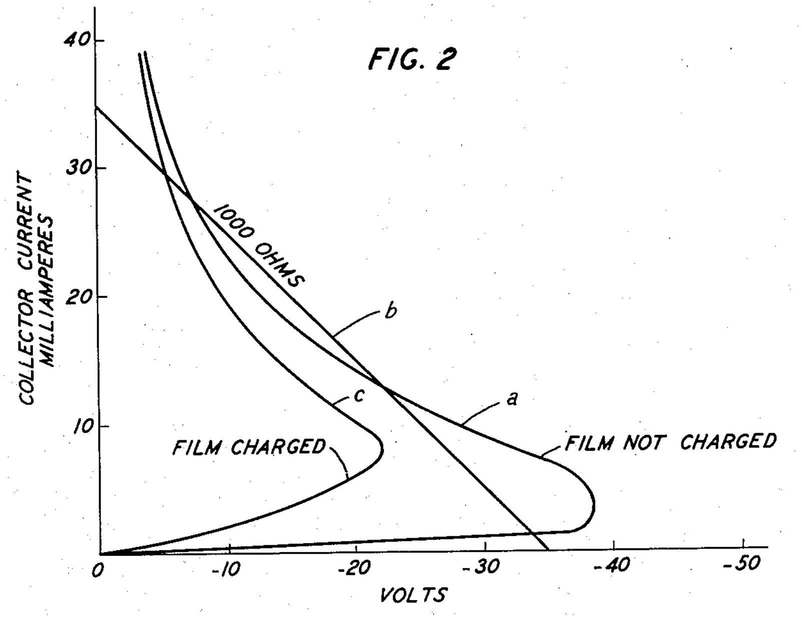
Fig. 2 shows the relevant portions of current-voltage characteristics of a diode as utilized in practicing the invention.

Referring to Fig. 2, the curve *a* shows the significant portions of the reverse current-voltage characteristic of a non-linear element suitable for practicing the invention, such as a germanium point contact diode. For low values of the reverse current, the resistance is very high, namely, about 15,000 ohms, as indicated by the shallow slope of the first branch of the curve. For some intermediate value, e. g., in the curve, about 4 milliamperes, a peak voltage of approximately 40 volts negative is reached beyond which the slope of the curve is in the other direction and varies along the curve, indicating a negative resistance whose magnitude depends on the current. A straight line *b* joins a point representing an open circuit voltage of 35 volts negative with a point representing a short-circuit current of 35 milliamperes. This straight line is the characteristic of the resistor 11 and the battery 12 of Fig. 1, and the slope of the line shows that it represents the conditions which obtain with a value of 1000 ohms for the resistor 11 and a voltage of 35 volts for the battery 12. It will be observed that this straight line *b* intersects the characteristic *a* of the diode in three points. The first intersection point, at a voltage of only slightly less than 35 volts negative and a current of about 1 milliampere, represents a stable operating condition which obtains before the surface film is charged. The second point of intersection, at about 22 volts and 12 milliamperes, represents an unstable condition because the diode characteristic slopes more steeply than does that of the resistor into which it works. The third intersection point, at a voltage of 10 volts and a current of 28 milliamperes, represents a second stable condition.

Figure 3:
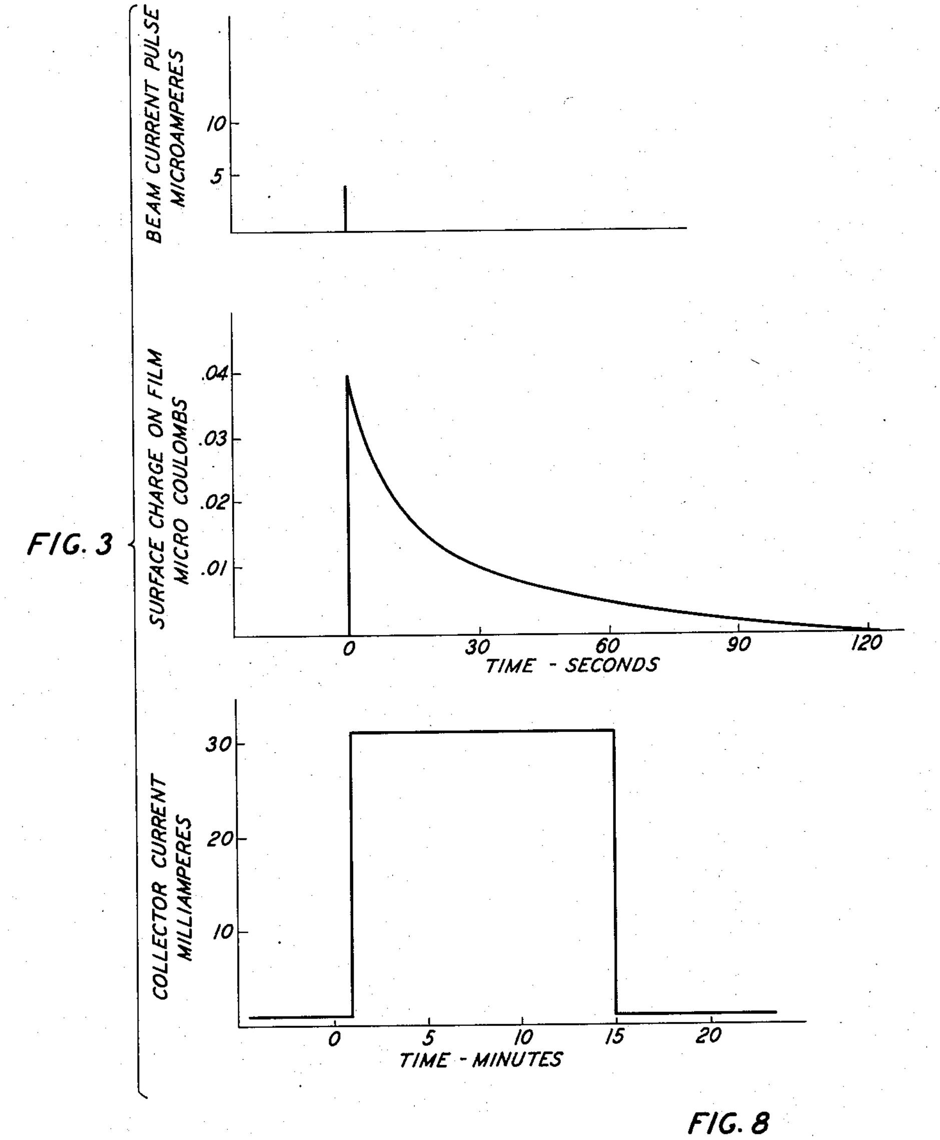
Fig. 3 is a group of wave-form diagrams of assistance in explaining the operation of the apparatus of Fig. 1.

In Fig. 3, the upper curve shows a pulse of beam current which may be both very small and very brief, for example, it may have a magnitude of only 5 microamperes and endure for only 10 milliseconds or so. It thus deposits a minute electric charge on the surface film, which is of the order of fractions of a microcoulomb, as indicated in the second curve of Fig. 3. This charge proceeds at once to leak off the surface film because of its extreme thinness. However, instantaneous deposition of even this small charge has been found to trip the diode from its first stable condition to or close to its second stable condition.

The exact mechanism of this action is not known. Without necessary subscription to any particular theory, it is suggested that the action may be as follows. When the surface film is first charged by the impact of the electrons of the cathode beam, an initial increase in the conductivity of the collector contact takes place in the manner explained in the aforementioned Bardeen patent and in the aforementioned application of Frank Gray. Because the contact resistance is much higher than the load resistance, this initial collector conductivity increase results in an increase in the collector current and so in the consumption of a greater amount of power at the collector contact point and, therefore, in heating the semiconductor block in tis region. It is believed probable that the heating of the block results in a depression of the current-voltage characteristic as a whole, including its peak voltage, in the direction of the voltage axis, as indicated in the curve *c* of Fig. 2. With the exceedingly thin insulating film of the invention and consequently very strong electric field at the semiconductor block surface and especially if its surface layer is temperature-sensitive, the depression of the peak voltage is such that this peak now lies to the left of the straight-line characteristic of the load resistor so that there is now only one intersection point instead of three; and this intersection point is seen to represent an operating condition of about 29 milliamperes and 8 volts. This is so close to the third intersection of the first characteristic *a*, namely, 28 milliamperes and 10 volts, as to make it uncertain whether the final stable operating condition is represented by the third intersection point of the curve *a* or by the only intersection point of the curve *c*.

Whatever the action may be, the result is an abrupt large increase in the collector current of the order of ten to one, as indicated by the lower curve of Fig. 3. It may be noted that the collector current increase is about 6000 times as great as the beam current pulse. Because the new operating condition is a stable one, there is no tendency to return to the original low current-high voltage condition, and the high current-low voltage condition persists indefinitely and substantially unchanged, as indicated in the lower curve of Fig. 3. To alter it and to return to the original conditions, it suffices momentarily to open the circuit of the collector 10. This immediately reduces the current to zero. When the collector circuit is again reestablished and the voltage of the battery 12 is so applied to the collector contact in series with the load resistor 11, the conditions are once more those of the first intersection point of the curve *a*. The surface charge, which may have long ago leaked off the very thin insulating film, no longer has any effect.

It is a characteristic of this trigger action that it depends on the location of the beam with respect to the collector contact. It occurs only when the beam impinges on the semiconductor block very near to the collector contact. The effect becomes marginal as the beam is deflected away from the contact, and it does not occur when the point of impact of the beam on the block is more than $\frac{1}{16}$ inch away from the collector contact point. As a result of these characteristics, the trigger action can be initiated by the different means. Referring to Fig. 1, it can be controlled by control of the current in the electron beam 6; and it can be controlled by deflecting the beam 6 with respect to the collector contact 10.

Similar trigger action may be caused by a beam of positive charges impinging on P-type germanium whose surface is covered with a thin insulating film of germanium oxide and on other semiconductor materials when their surfaces are covered with a thin insulating film of an appropriate insulator. In each case, the polarity of the collector bias potential source is to be so correlated with the conductivity characteristics of the material and with the sign of the bombarding charges that the collector shall operate in its reverse direction, and the resistance of the load and the voltage of the collector current source are to be so adjusted that the first intersection point of the load line with the diode characteristic is close to its reverse voltage peak, and the slope of the load line at this intersection point is considerably steeper than that of the curve $a$.

The thickness of the insulating film determines the field strength at the surface of the semiconductor block for a given charge density on the film. In general, the thinner the film, the greater the certainty of the trigger action.

Figures 4, 5, 6:
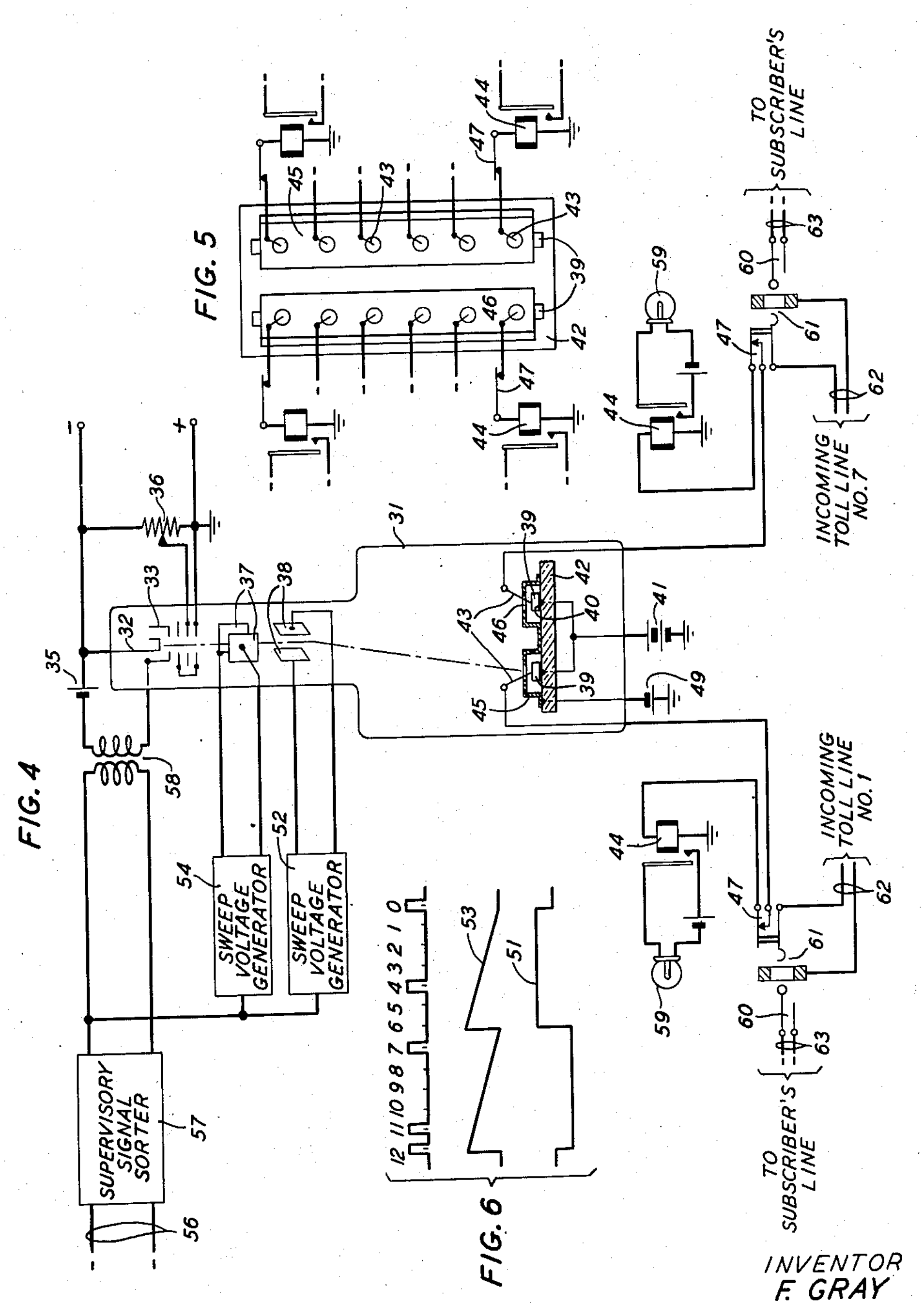
Fig. 4 is a schematic diagram showing switching apparatus embodying the invention.
Fig. 5 is a plan view showing the target construction of Fig. 4.
Fig. 6 is a group of wave-form diagrams of assistance in explaining the operation of the apparatus of Fig. 4.

Fig. 4 illustrates the application of the invention to a supervisory system for telephone calls where it operates to convert a sequence of pulses appearing on a single input conductor and following one another in time after the fashion of time division multiplex systems into a quasi-permanent pattern or distribution of electrical conditions appearing on a plurality of output conductors. This system utilizes the feature of the invention by which it converts a fleeting input signal into an enduring output signal. The apparatus comprises an evacuated envelope 31 containing an electron gun comprising a cathode 32, a control electrode 33, and beam-focusing electrodes 34, which are arranged to be supplied with suitable operating bias potentials by a battery 35 and by a potentiometer 36, respectively, longitudinal deflecting elements 37 and lateral deflecting elements 38 which may be conventional, and an electron beam target which may comprise two strips 39 of peak back voltage germanium arranged side by side. Each strip may be provided on its lower face with a conducting film 40 of metal which serves as a base electrode, and these base electrodes may be connected together and to the positive terminal of a suitable potential source 41. The strips may together be mounted side by side on a supporting base 42 of insulating material. Each of the germanium strips is provided on its upper surface with a film of insulating material, for example, germanium oxide applied in the manner described hereinabove, and each of a plurality of wires 43 with sharpened ends arranged side by side pierces the insulating film to make point contact with the germanium material 39 beneath it. These individual point contact electrodes, which may be termed collectors, are connected by way of the magnetizing windings 44 of a plurality of relays and by way of individual switches 47 and ground to the negative terminal of the potential source 41. The germanium strips 39 are provided with a common auxiliary electrode 45, which may comprise a small metal plate having holes 46 pierced through it to admit the collector electrodes 43 and the beam, and mounted on the insulating plate 42. This auxiliary electrode is connected to the negative terminal of a potential source 49. It serves to prevent escape of secondary electrons from the film. The construction of the target assembly is shown in detail in the plan view of Fig. 5.

Instead of each single strip of germanium, a plurality of germanium blocks equal in number to the number of point contact electrodes may be employed instead. The single strips 39 are considered simpler and, in view of the small area of influence of the electron beam on the insulated surface, equally satisfactory.

The lateral deflecting elements 38 are provided with a voltage 51 (Fig. 6) having a square wave form derived from a sweep voltage generator 52, for example, a multivibrator, whose operation is synchronized with a train of incoming pulses. Similarly, the longitudinal deflecting elements 37 are supplied with a voltage 53 of saw-tooth wave form which is the output of a second sweep voltage generator 54 which may be of conventional construction and may be driven by and synchronized with pulses of the incoming train, or, if preferred, it may be driven by the output of the multivibrator 52.

With the sweep voltage generators 52, 54 arranged in this manner, an electron beam originating at the cathode 32 and focused by the electron-optical structure 34 is deflected by the voltage 51 on the lateral deflecting elements 38 onto one germanium strip 39 or the other and, for each such deflection, is swept longitudinally of the strip by the voltage 53 on the longitudinal deflecting elements 37.

In operation, it is to be conceived that a small fraction of the available channel time of a telephone toll system is assigned to a group of supervisory pulse signals which are indicative of the activity distribution among the members of a group of incoming toll lines. With the help of suitable multiplexing equipment, the sending end operator establishes the correct arrangement of pulses in the group. Such a group is indicated in the upper part of Fig. 6. It may comprise, in a simple case, a sequence of twelve available pulse positions or time slots, any one or all of which may contain a pulse, and preceded by a group marker pulse position which always contains a pulse designated No. 0 which serves to initiate the sweep operations. The whole train may endure, for example, $\frac{1}{100}$ second, and it may be followed by another train after an interval of one second or even a much longer period, such as 10–30 seconds. The supervisory pulse group may be separated at the incoming terminals 56 of the apparatus from the message signals by suitable sorting equipment 57 and may be applied as positive voltage pulses to the beam-modulating electrode 33, which is normally biased to cut-off, for example, by way of a transformer 58, each pulse operating individually to turn the beam on when it arrives.

In the example shown, pulses are present in the pulse train at positions Nos. 4, 7, 11, and 12. In this arrangement, the cathode beam is first briefly turned on in the course of its longitudinal sweep along the first germanium strip at the instant at which the electrons of the beam are impacting the insulating film in the neighborhood of collector No. 4. It is turned on again briefly at the instants at which, in the course of its longitudinal sweep along the second strip, it is in the vicinity of collectors Nos. 7, 11, and 12. Each such brief beam pulse acts in the manner described in connection with Fig. 1 to throw the diode on which it impinges from its low current stable condition to its high current stable condition. Thus, large increases are developed in the currents flowing through the windings 44 of relays Nos. 4, 7, 11, and 12. These current increases are sufficient to pull up the relay armatures and so to light indicator lamps 59.

These indicator lamps 59 may be arranged on a telephone operator's switchboard, and each lamp may identify an incoming toll line. By the foregoing sequence of events, lamps have been lighted which are indicative of incoming calls on lines Nos. 4, 7, 11, and 12. Despite the rapid decay of the surface charges applied by the beam pulses to the individual diodes as described above, each of the collector currents persists indefinitely until it is artificially extinguished.

The receiving operator, who may have been otherwise engaged for several seconds or minutes, sees before her the illuminated lamp 59 which indicates an incoming call. She then inserts a plug 60 into a jack 61 and completes a message circuit from an incoming toll line 62 to a subscriber's line 63. The plug 60, which may be otherwise conventional, may be modified in well-known fashion so that its insertion in the jack 61 also opens the switch 48 momentarily, thus breaking the collector circuit in question and immediately reestablishing it. Thus, except while the jack is being inserted or removed, the collector circuit is in readiness for another supervisory signal because the diode operating conditions are reestablished at the first intersection point of the curve *a* of Fig. 2.

Insertion by the operator of her plug 60 into any one of the twelve jacks 61 similarly enables her to establish a message circuit from an incoming line 62 to a subscriber's line 63 and extinguishes the supervisory lamp 59.

The foregoing illustrative embodiments were chosen for the purpose of describing the invention in a relatively simple manner. The device can, however, be constructed in other forms, and it can be utilized to perform more complicated operations. For operations involving many output circuits, it is desirable to arrange the collectors in an extended two-dimensional array and to bring the collector leads out in a manner that does not interfere with the electron beam. An alternate output assembly with these desirable features is shown in Figs. 7 and 8.

Figure 7:
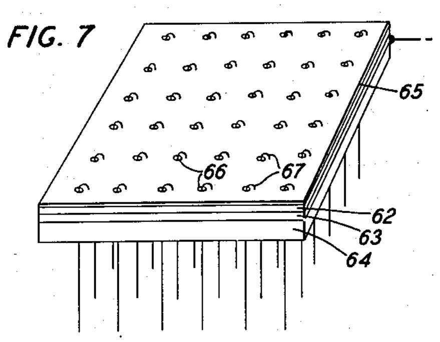
Figs. 7 and 8 show constructional details of a target assembly alternative to that of Fig. 5.
Figure 8:
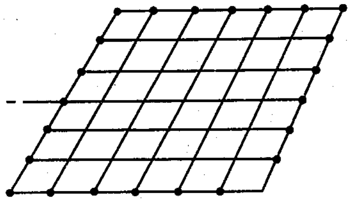

Fig. 7 shows a target assembly in which the target itself comprises a single sheet 62 of semiconductor material such a germanium backed by a metallic base 63 mounted on an insulating support 64 and bearing a superficial film 65 of insulation. A multiplicity of small holes 66 are drilled through this assembly, one for each collector wire 67, and the wires are brought in from the back of the target through insulating sleeves and bent over to make point contacts with the front surface of the germanium. A common auxiliary electrode may be constructed in the form of a wire grid or screen, as shown in Fig. 8, located in front of the semiconductor sheet; and its openings may register with the collector units to permit free passage of the electrons of the beam to these elements. The constructional details may be shown in the aforementioned application of Frank Gray. Alternatively, a target may be employed which is similar to the one just described, but the holes for the collector wires are tapered to form sharp edges. Each collector wire may be supported in a button of insulating material in a manner to bear against the sharp inner edge of one of these tapered holes. The constructional details of such a collector unit may likewise be as shown in the aforementioned application of Frank Gray.

While the trigger action of the invention has been described as being precipitated by the impact of an electron beam, it can also be precipitated by the deposition of ions, positive or negative, which may be generated by the ionization of a gas or the like. While illustratively described as embodied in a pulse distributor system, the invention also lends itself readily to embodiment in a lock-out circuit. Still other modifications and uses will suggest themselves to those skilled in the art.

What is claimed is:

1. Apparatus which comprises a body of semiconductor material, a metallic electrode making contact therewith, a thin charge-sensitizing film containing a trace of distributed carbonaceous material on a surface of said body and adjacent said electrode contact, and means for applying a stream of charged particles to said film.

2. Apparatus which comprises a body of semiconductor material, a metallic electrode making contact therewith, a thin charge-sensitizing film containing a very small amount of distributed carbonaceous material on a surface of said body and adjacent said electrode contact, means for applying to said film a surface charge of high density whereby, when said film is uncharged, the current-voltage characteristic of said electrode to semiconductor contact has a particular uncharged voltage peak at a first value of current, and, when said film is charged, said characteristic has a substantially lesser charged voltage peak at a second value of current, a voltage source greater than said charged voltage peak in series circuit with said electrode and said body, a load also in said series circuit having a resistance less than the difference between the voltage source and the charged voltage peak divided by said second value of current and greater than the difference between the voltage source and the uncharged voltage peak divided by said first value of current.

3. Apparatus which comprises a body of semiconductor material, a metallic electrode making contact therewith, a thin charge-sensitizing film containing a very small amount of distributed carbonaceous material on a surface of said body and adjacent said electrode contact, means for applying to said film a surface charge of high density whereby, when said film is uncharged, the current-voltage characteristic of said electrode to semiconductor contact has a particular uncharged voltage peak, and, when said film is charged, said characteristic has a substantially lesser charged voltage peak, and a voltage source greater than said charged voltage peak in series with said electrode and said body.

4. Apparatus which comprises a body of semiconductor material, a metallic electrode making contact therewith, a thin charge-sensitizing oxide layer containing residual traces of an oxidizing agent containing a very small amount of distributed carbonaceous material on a surface of said body and adjacent said electrode contact, and means for applying a stream of charged particles to said layer.

5. Apparatus which comprises a body of semiconductor material, a metallic electrode making contact therewith, a thin charge-sensitizing film on a surface of said body and adjacent said electrode contact, the electrode to semiconductor contact when said film is uncharged having a current-voltage characteristic with a particular uncharged voltage peak at a first value of current, and said film when charged having a characteristic with a substantially lesser charged voltage peak at a second value of current, means for applying to said film a surface charge of high density, a voltage source greater than said charged voltage peak in series circuit with said electrode and said body, a load also in said series circuit having a resistance less than the difference between the voltage of said source and the charged voltage peak divided by said second value of current and greater than the difference between the voltage of said source and the uncharged voltage peak divided by said first value of current.

6. In combination with apparatus as defined in claim 5, an auxiliary electrode disposed adjacent said film, and means for applying to said electrode a potential of a polarity to retain said surface charges on said film.

7. Apparatus as defined in claim 5 wherein the film-charging means comprises means for generating a beam of electrons and means for directing said beam upon said film.

8. Apparatus as defined in claim 5 wherein the conductivity of the semiconductor body is N-type.

9. Apparatus which comprises a body of semiconductor material, a metallic electrode making contact therewith, a thin charge-sensitizing film on a surface of said body and adjacent said electrode contact, the electrode to semiconductor contact when said film is uncharged having a current-voltage characteristic with a particular uncharged voltage peak at a first value of current, and said film when charged having a characteristic with a substantially lesser charged voltage peak at a second value of current, means for applying to said film a surface charge of high density, and a voltage source greater than said charged voltage peak and less than said uncharged voltage peak in series circuit with said electrode and said body.

FRANK GRAY.

References Cited in the file of this patent

UNITED STATES PATENTS

| Number | Name | Date |
|---|---|---|
| 2,307,438 | Whitaker | Jan. 5, 1943 |
| 2,374,666 | Cunniff | May 1, 1945 |
| 2,524,033 | Bardeen | Oct. 3, 1950 |
| 2,547,386 | Gray | Apr. 3, 1951 |